United States Patent [19]
Ney

[11] Patent Number: 5,005,203
[45] Date of Patent: Apr. 2, 1991

[54] METHOD OF RECOGNIZING CONTINUOUSLY SPOKEN WORDS

[75] Inventor: Hermann Ney, Hamburg, Fed. Rep. of Germany

[73] Assignee: U.S. Philips Corporation, New York, N.Y.

[21] Appl. No.: 175,085

[22] Filed: Mar. 30, 1988

[30] Foreign Application Priority Data

Apr. 3, 1987 [DE] Fed. Rep. of Germany ....... 3711348

[51] Int. Cl.$^5$ ............................................... G10L 5/00
[52] U.S. Cl. .......................................... 381/43; 381/41
[58] Field of Search .................................... 381/41–43; 364/513.5

[56] References Cited

U.S. PATENT DOCUMENTS

| | | | |
|---|---|---|---|
| 4,156,868 | 5/1979 | Levinson | 381/43 |
| 4,400,788 | 8/1983 | Myers et al. | 381/43 |
| 4,713,778 | 12/1987 | Baker | 381/43 |
| 4,748,670 | 5/1988 | Bahl et al. | 381/43 |

OTHER PUBLICATIONS

Ney, "The Use of a One-Stage Dynamic Programming Algorithm for Connected Word Recognition", IEEE Trans. on ASSP, vol. ASSP-32, No. 2, Apr. 1984, pp. 263–271.

Woods, "Transitional Network Grammar for Natural Language Analysis", Computational Linguistics, Communications of the ACM, vol. 13, No. 10, Oct. 1970, pp. 591–606.

Lea, "An Approach to Syntactic Recognition Without Phonemics", IEEE Trans. on Audio & Electroacoustics, vol. AU-21, No. 3, Jun. 1973, pp. 249–258.

Tennant, "Syntax", *Natural Language Processing*, Petrocelli book, New York/Princeton, 1981, pp. 75–100.

Itahashi et al., "Discrete-Word Recognition Utilizing a Word Dictionary and Phonological Rules", IEEE Trans. on Audio and Electroacoustics, vol. AU-21, No. 3, Jun. 1973, pp. 239–249.

*Primary Examiner*—Dale M. Shaw
*Assistant Examiner*—David D. Knepper
*Attorney, Agent, or Firm*—Bernard Franzblau

[57] ABSTRACT

A method of recognizing continuously spoken words in which, during the speech recognition, speech values derived from the speech signal are compared with comparison values of the individual words of a given vocabulary. In order to reduce the rate of recognition errors, it is essentially known to take into account speech models, which consequently admit only selected sequences of words. From the theory of the formal languages, a class of speech models designated as "context-free grammar" is known, which represents a comparatively flexible speech model. For the use of this speech model in the technical process of recognition of a speech signal two lists are now utilized, which indicate the assignment between words and given syntactical classes and the assignment of these classes to, as the case may be, two other classes. Both lists are used at each new speech signal in that there is constantly considered backwards, which class explains most clearly the preceding speech section. At the end of the speech signal, starting from the class indicating the whole sentence, the sequence of the words can be followed backwards, which has yielded the smallest total distance sum and which moreover fits into the speech model given by the two lists.

4 Claims, 4 Drawing Sheets

| | |
|---|---|
| 1 | INITIALIZE: $S(j,i|U)$ = infinite |
| 2 | FOR i = 1,(+1),I DO |
| 3 | FOR EACH WORD u DO |
| 4 | $D(j,i|u)$, $i-2J \leq j \leq i$ : backward time alignment |
| 5 | FOR j = i-1,(-1),Max(0,i-2J) DO |
| 6 | FOR q = 1,(+1),Q DO |
| 7 | $(U,u) = (U \to u)(q)$ |
| 8 | IF $D(j,i|u) < S(j,i|U)$ THEN $S(j,i|U)=D(j,i|u)$<br>$B(j,i|U)=q$<br>$F(j,i|U)=0$ |
| 9 | FOR j = i-1,(-1),0 DO |
| 10 | FOR r = 1,(+1),R DO |
| 11 | $(U,V,W) = (U \to VW)(r)$ |
| 12 | FOR l = j+1,(+1),i-1 DO |
| 13 | $X = S(j,l|V) + S(l,i|W)$ |
| 14 | IF $X < S(j,i|U)$ THEN $S(j,i|U)=X$<br>$B(j,i|U)=r$<br>$F(j,i|U)=1$ |

Fig.1

METHOD OF RECOGNIZING CONTINUOUSLY SPOKEN WORDS

BACKGROUND OF THE INVENTION

This invention relates to a method of recognizing a speech signal which is derived from coherently spoken words and consists of a temporal sequence of speech values, each of which indicates a section of the speech signal, the speech values being compared with given stored comparison values, of which each time a group of comparison values represents a word of a given vocabulary, and the comparison results are summed up over different sequences of combinations of comparison values and speech values to a distance sum per sequence.

Such a method is known from DE-OS No. 3,215,868 and from the magazine "I.E.E.E. Transactions on Acoustics, Speech and Signal Processing", Vol. Assp-32, No. 2, Apr. 1984, pp. 263 to 271. Consequently, a larger number of different sequences of comparison values and hence of words are permanently followed because it is possible that a sequence which accidentally does not exhibit the smallest distance sum nevertheless proves in the end to be the most suitable upon comparison of the further speech values. In the known methods, as speech values the prior art predominantly uses sample values of the speech signal, which were produced at a 10 ms distance and were decomposed into their spectral values. However, other measures for processing the sampled speech signals may also be used. Likewise, the speech values may also be obtained from several sample values and may represent, for example, diphones or phonemes or even larger units, which does not essentially change the method.

In the second of the aforementioned documents, it is indicated that it is effective to provide syntactical limitations, more particularly in a large vocabulary, in order to increase the certainty and reliability of recognition. These limitations become effective each time at the word transitions and they essentially consist of a speech model in the form of a network which is taken into account, i.e. in the sense of the formal languages a regular grammar. Such a speech model is comparatively rigid and inflexible, however, with the result that only sentences constructed in a given manner can be recognized if the number of possibilities provided for sentence constructions in the speech model is not to assume excessively large values.

From the theory of the formal languages, a further class, i.e. the context-free grammar is known, which is more flexible and can record more satisfactorily the structure of real spoken sentences.

SUMMARY OF THE INVENTION

An object of the present invention is to provide a method of the kind mentioned in the opening paragraph which, during the recognition, takes into account limitations of a speech model in the sense of a context-free grammar.

According to the invention, this object is achieved in that at each new speech value for each word there is calculated and stored in a first memory the distance sum of sequences which for each word begin at different earlier speech values as a starting point, traverse the whole word as far as the instantaneous speech value and, related to the respective starting point, produce a minimum distance sum. Then according to an assignment of the words of the vocabulary contained in a first fixedly stored list per word of at least one syntactical class, for each class the smallest distance sum of all the words assigned to this class are stored in a second memory together with an indication about the assignment of the word yielding this smallest distance sum. Susequently according to a second fixedly stored list, there is checked whether, and as the case may be, into which two further syntactical classes each class can be subdivided and each time when a subdivisibility is ascertained again for each starting point as far as the earliest speech signal. Next are added each distance sum stored for the one of the two further classes for the respective starting point and a number of intermediate points and the distance sum stored for the other of the two further classes for the intermediate point and the instantaneous speech value. The intermediate points lying successively at points adjacent to each other between the starting point and the instantaneous speech value. Each sum is compared with the distance sum of the subdivided class and, in case it is larger than the smallest of the added distance sums, is stored instead thereof together with an indication about the subdivision a particular the intermediate point which has yielded the smallest sum. After processing of the last speech value from the class indicating a whole sentence through the subdivision into further classes indicated therein at the storage site for the first speech value as starting point and through the subdivisions indicated at the respective further classes, a sequence of words is determined and supplied as recognized spoken words.

The recognition is therefore carried out quasi at two levels, i.e. on the one hand at the level of the individual words and on the other hand at the level of the syntactical classes, which indicate cohesions between words. Thus, the sequence of words yielding the smallest distance sum is not directly recognized, but such a sequence of words is recognized, which correspond to the syntactical limitations in the form of the syntactical classes and yield the smallest distance sum under this limitation. As a result, the recognition of coherently spoken words becomes considerably more reliable.

When determining the distance sum for the sequences, these sequences can essentially be followed back over an arbitrary distance, i.e. the starting point can lie in the extreme case at the beginning of the sequence of the speech values. Since, however, practically the length of the individual words is limited and is considerably shorter than the whole sentence to be recognized it is effective in determining the distance sums that the starting points of the sequences cover at most double the length of the longest word of the vocabulary from the instantaneous speech value. Thus, the amount of labour required for the calculation and the storage is limited because the first memory consequently has a limited length. Only the required capacity of the second memory depends upon the length of the speech signal to be recognized.

An arrangement for carrying out the method according to the invention will be described in connection with FIG. 8 of the drawing.

BRIEF DESCRIPTION OF THE DRAWINGS

In order that the invention may be readily carried out, it will now be described more fully, by way of example, with reference to the accompanying drawing, in which:

FIG. 1 shows the whole procedure of a method according to the invention with the aid of a diagram.

DESCRIPTION OF THE PREFERRED EMBODIMENTS

The procedure of the method according to the invention shown by the diagram in FIG. 1 starts at the step 1 with a number of values $S(j,i|U)$ being set to a maximum value corresponding to the range of numbers used. These are the values of the second memory, as will be explained hereinafter.

The step 2 only states that the subsequent steps for each new speech value i, beginning from the first to the last speech value I, are to be carried out, that is to say that they are cyclically repeated for each new speech value. A speech value can then indicate the spectrum of a section of a 10 ms duration of the speech signal, but it may also be a value which is derived from several of such sections of the speech signal and which indicates, for example, a diphone or a phoneme. The exact build-up of the speech value is of no importance for the further description; only the comparison values of the words of the vocabulary must be produced in the same manner or be derived from sample speech signals.

The step 3 again states only that the next step 4 is carried out for each word of the vocabulary, which is designated here generally by u. In step 4, distance sums $D(j,i|u)$ for different sequences are now determined by the word, an example of such sequences will now be explained with reference to FIG. 2. The distance sums of the individual sequences are determined in essentially the same manner as indicated in the aforementioned DE-OS No. 32 15 868, but now only in the reverse direction.

Figure 2:
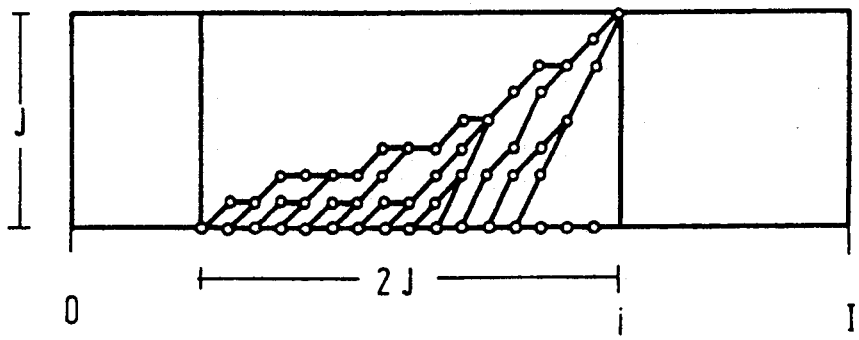
FIG. 2 shows an example for a number of sequences in a word, for which each time a distance sum is produced.

In FIG. 2, the one direction corresponds to the sequence of the individual speech values i, which range from 0 to I. The perpendicular direction corresponds to the sequence of the comparison values of an arbitrary word, it being assumed here that this word comprises J comparison values. The sequences, whose distance sums should be calculated here, should start at the earliest at the point i-2J when i is the instantaneous speech value, that is to say that in the speech signal the word is spoken at most at a two times lower rate than the word in the vocabulary. Consequently, 2J speech values of the longest word of the vocabulary must then be temporarily stored. Essentially, the build-up of the sequences is also possible from the left to the right in that, starting from each speech signal and the first comparison value, the minimum distance sums of the sequences are determined, which must then be temporarily stored instead of the speech signals. For the principle of the method to be described, this is not of importance, however, so that the build-up of the sequences in the backward direction is explained more fully.

First, the instantaneous speech value i is therefore compared with the last comparison value of the word and the distance between these two values is determined. Subsequently, the preceding speech value is compared with the last comparison value and the preceding comparison values of the word and the distances are increased by the first distance and, as the case may be, moreover by a fixed distance-dependent value. Initially, starting from the beginning point, further sequences (not shown) are obtained, in the critical case also a first horizontally extending sequence and a first vertically extending sequence, of which it is assumed here, however, that they yield larger distance sums during the procedure so that they are not taken further into account. However, first a number of sequences are followed further in that each time a preceding speech value is compared with a number of comparison values and the distance then obtained is added each time to the smallest preceding distance sum. Thus, all sequences gradually arrive at the lower edge, i.e. at the first comparison value, but for each lower point of the line, which in the natural succession of time of the speech values represents a starting point of a sequence, each time only the sequence is taken into account which has the smallest distance sum. The individual starting points are then provided with the index j. Thus, at a given speech value i, a distance sum is obtained for each value j and each word u, which sum is stored in a first memory, whose contents consequently have the build-up shown in FIG. 3. The starting points j are plotted in the horizontal direction, while the words u1, u2, u3 ... of the vocabulary are plotted in the vertical direction. In the fields of the generally assumed starting points $j=k$ and $j=k+1$, the distance sums $D(k,i|u_3)$ etc. determined for the words u2 and u3 are indicated. The remaining fields are filled correspondingly.

Figure 3:
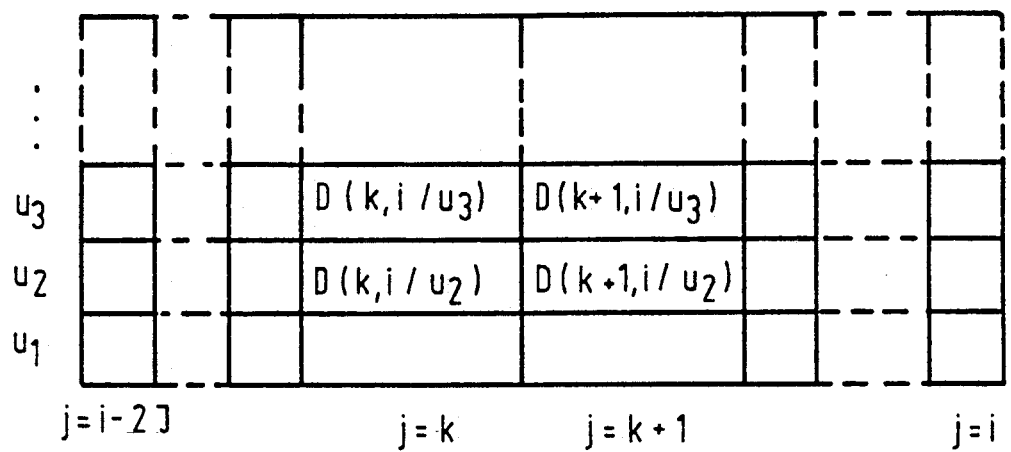
FIG. 3 shows diagrammatically the contents of the first memory.
Figure 4:
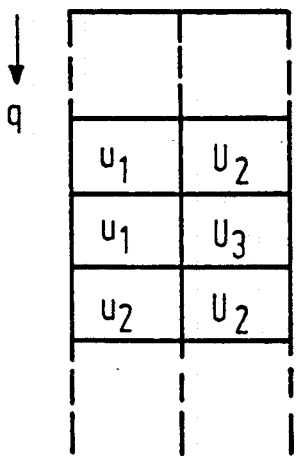
FIG. 4 shows diagrammatically the contents of the first list.

After the first memory shown in FIG. 3 has been filled in this manner with the distance sums, according to step 5 the steps 6 to 8 are carried out for each of the starting points j, beginning from the starting point immediately preceding the instantaneous speech value. In step 6, a list, of which a part is shown in FIG. 4, is interrogated line by line q, this list indicating the assignment of a word according to FIG. 4, for example of the word $u_1$, to a syntactical class U, for example to the classes $U_2$ and $U_3$, as shown in FIG. 4. Given words may also be assigned, for example, to only one class or to more than two classes, while conversely every class mostly is assigned to several words. Each assignment is temporarily stored according to step 7 and in step 8 the distance sum $D(j,i|u)$ of the word u from the beginning point j to the end point i is compared with a value $S(j,i|U)$ of the assigned class U already mentioned in the beginning, which value is contained in a second memory, whose build-up with regard to contents is indicated in FIG. 5.

For each pair of values i and j, where j is smaller than i, a storage site is present, which besides the value S hold two further values B and F, as is indicated in FIG. 1 in step 8. Because of the limitation that j is smaller than i, a matrix is obtained which does not contain any values below the diagonal line. The size of this matrix depends upon the length of the sentence to be recognized, i.e. upon the number of the speech values i. The matrix shown in FIG. 5 is now present for each syntactical class occurring in the list shown in FIG. 4, that is to say that the whole second memory can be considered as a three-dimensional matrix of stacked two-dimensional matrices according to FIG. 5 so that, consequently, for each speech value i a plane at right angles to the plane of the drawing of FIG. 5 with storage sites for the individual starting points j and the possible classes U is present. Since the step 8 in FIG. 1 is carried out each time for a speech value i and a starting point j for all assignments, the distance sum $D(j,i|u)$ of a word from the first memory and the further words in the corresponding class of the second memory being introduced if this distance sum is smaller than that already shown at the relevant point $S(j,i|U)$, each time a column of the first memory shown in FIG. 3 is therefore imaged on a vertical column of the second memory according to the assignment in FIG. 4, i.e. in order of succession for all starting points j. Since in this manner at each speech value i the essential contents of the first memory according to FIG. 3, i.e. the smallest distance sum of the words of a class together with the indication of the word supplying this minimum over the line q of the assignment list shown in FIG. 4, is imaged in the second memory, the first memory of FIG. 3 can be erased again or can be overwritten by means of the next speech value i.

Figure 5:
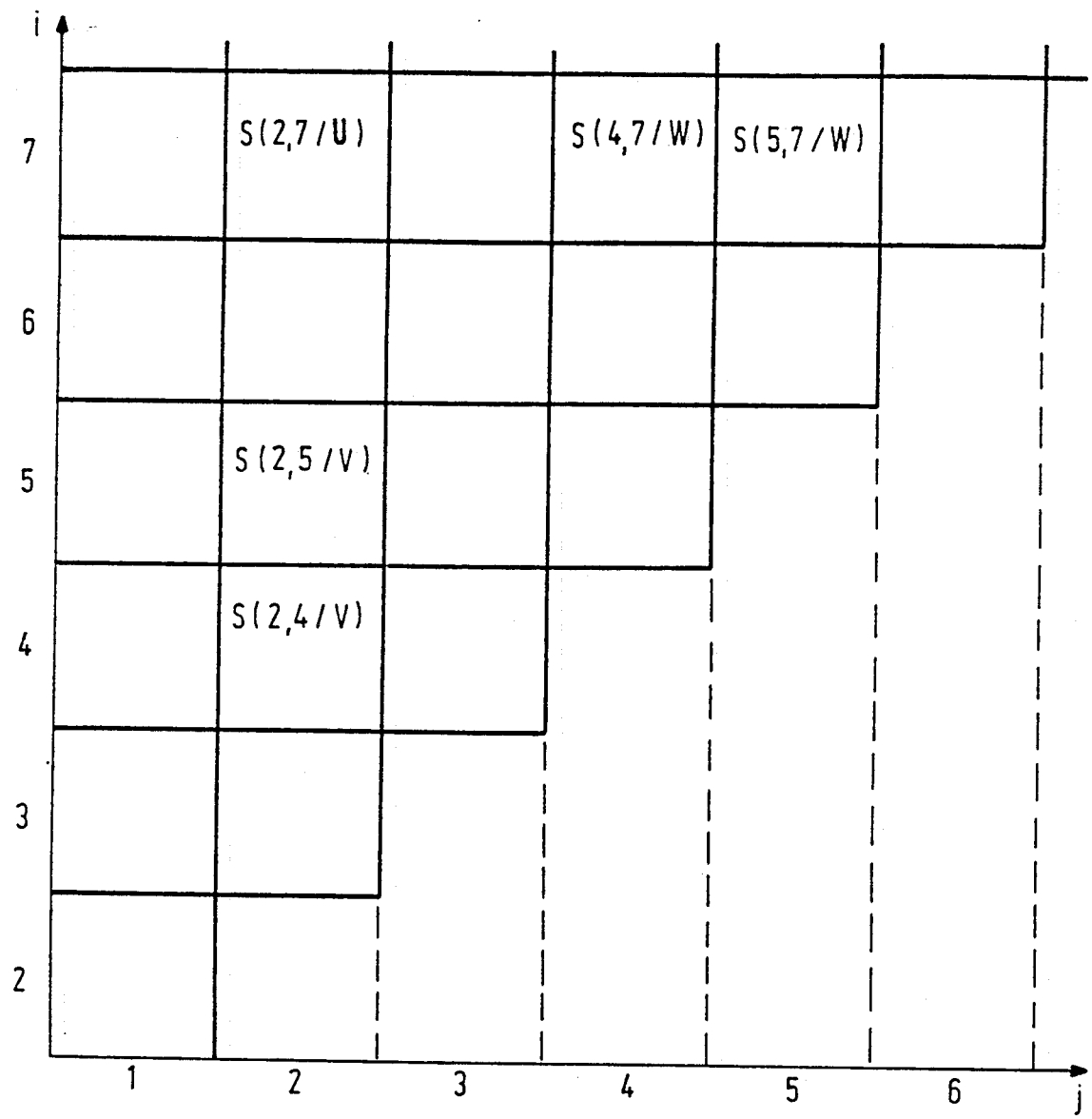
FIG. 5 shows diagrammatically the contents of the second memory.

The second memory shown in FIG. 5 is therefore filled successively linewise or according to accurate planes, the maximum values originally written in step 1 being each time overwritten. Since the capacity of the first memory is limited, however, in one dimension to 2J, J being the length of the longest word of the vocabulary, at later speech values i at the storage sites of the originally written maximum starting values are maintained at any rate in increasingly larger ranges on the lefthand side of the vertical planes. The remaining storage sites contain an indication or an estimation about how well a speech section between a terminal value i and a starting value j goes with a given syntactical class and an indication as to which word within this class shows the best conformity.

Figure 6:
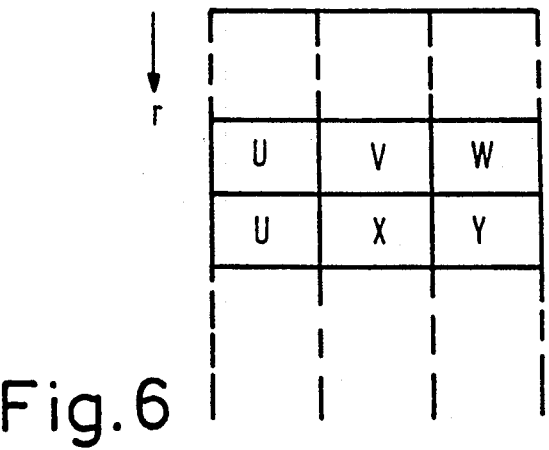
FIG. 6 shows diagrammatically the contents of the second list.
Figure 7:
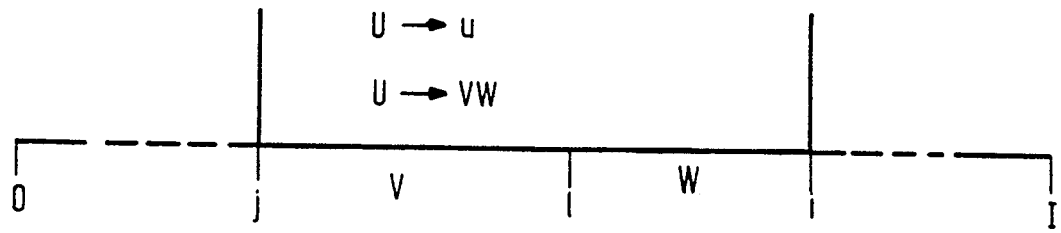
FIG. 7 shows the subdivision of a syntactical class into further classes.

However, the main object is to find the sequence of words which fits both into the speech model defined by the list shown in FIG. 4 and into the speech model defined by a further list shown in FIG. 6 and whose overall distance sum is moreover a minimum with respect to other word sequences, which also fit into the speech model. The cohesions between the syntactical classes must therefore be taken into account. This is effected according to FIG. 7 in that not only assignments between syntactical classes and words are given, but it is also admissible that one class can be subdivided into the immediate succession of two further classes. For example, it is assumed in FIG. 7 that the speech section from j to i was found to be the one going best with a word of the class U. This class can be a class which on the other hand can additionally be assigned to the sequence of two further classes V and W, that is to say that the class U may also be a composed class. For this subdivision, the limit l must be determined, for which the speech section j to i can be explained most suitably by the combination of the two classes V and W. It should be noted here that one or both of these classes V and W may be assigned again to further combinations of classes or directly to words of the vocabulary.

For determining the optimum limit l between the two classes V and W, it is assumed that the sum of the distance sums of the two classes should yield a minimum. Consequently, the sum of the distance sums of the two classes must be determined for different values of the limit l between j and i. This is effected by the steps 9 to 14 of the diagram of FIG. 1.

The step 9 indicates that the next steps are carried out each time for a given starting point j, i.e. for a given speech section, but j is now followed to the beginning j=0. Within each such a speech section, in step 10 a list is traversed, of which a part is shown in FIG. 6 and which indicates which syntactical classes can be subdivided into which further classes in a given order of succession. For example, the class may be subdivided into the classes V and W or into the classes X and Y and each subdivision is examined separately for different values of the limit l.

In step 11, for each subdivision thus found the line r of the list of FIG. 6 and the further classes obtained through the subdivision are held. For each such a subdivision for different values of the limit l between the starting point j and the terminal point i of the considered speech signal, the distance sums of the classes $S(j,l|V)+S(l,i|W)$ are determined according to step 13 for the corresponding subsections j to l and l to i, i.e. from the second memory, as shown in FIG. 5. The values indicated in FIG. 5 in the five fields represent an example thereof. In fact a speech section between the starting point j=2 and the terminal point i=7 is considered, from which it is first assumed that it can be explained by the syntactical class U, in which event the class U can again be assigned to the combination of the classes V and W. If the limit is assumed to be l=4, the values $S(2,4|V)$ and $S(4,7|W)$ must be read from the memory 5. The position of these values is indicated in FIG. 5, but it must be taken into account that these values lie in different planes of the matrix, which is indicated in FIG. 5 only two-dimensionally, but is actually three-dimensional. However, it can be seen from this position that these values were already calculated earlier and are in fact present because the matrix in FIG. 5 is filled with an increasing value i, as described above. Correspondingly, the values indicated in FIG. 5 required for a limit l=5 are present, etc.

Next, in step 13, the sum $x=S(j,l|V)+S(l,i|W)$ is formed from the values read out for a given limit l and it is checked in step 14 whether this sum is $x<S(j,i|U)$, i.e. smaller than the value present in the example of FIG. 5 for the value $S(2,7|U)$. This value is initially at the sites in the matrix with $j<i-2$, with j equal to the length of the longest word of the vocabulary still the starting value, which in step 1 was set to the maximum representable value. After the said sum formation and the said comparison have been carried out successively for all possible values of the limit l, the value $S(j,i|U)$ is the minimum of the sums then determined and moreover at this site of the matrix in FIG. 5 the number of the line of the list in FIG. 6 is stored, which contains the assignment of the classes to each time two other classes, while moreover the value of the limit l between the two further classes is stored. This is necessary so that at the end of the processing of all speech values the optimal path through a chain of words can be followed back.

This step of following back begins when all speech values i to the last speech value I inclusive have been processed, the said last-mentioned speech value being given or being determined, for example, by a recognition of a longer speech interval. There is started from the fact that one syntactical class describes the whole sentence and this class is designated by G for clarity. Consequently, in the second memory, the value B(O-

,I|G) is read out at the storage site O,I|G, which value is indicated by the line of the list of FIG. 6, which indicates that subdivision of the class G into two other classes which because of the preceding optimization yields the smallest total distance sum. Moreover, it is derived from the associated value F(O,I|G) where the limit between these two further classes is situated. The two classes, which are designated here, for example, by M and N, and their limit, whose value here may be k, are temporarily stored, after which the first class M is followed further. For this purpose, from the second memory the value B(O,k|M), which indicates the optimal subdivision for the recognized sentence of the class M into two further classes, and over the value F(O,k|M) the associated limit between the two further classes are read out and temporarily stored. This process is each time continued until a class occurs for which the associated value F is zero. This means that this last found class is assigned to a given word, this assignment being indicated by the associated value B. This is then the first word of the sentence. Subsequently, the process is carried out in the reverse direction and the second class of the last subdivision is further followed. Thus, all the words of the optimum chain are therefore searched and supplied. The recognition of the sentence of the coherently spoken words is then terminated.

Figure 8:
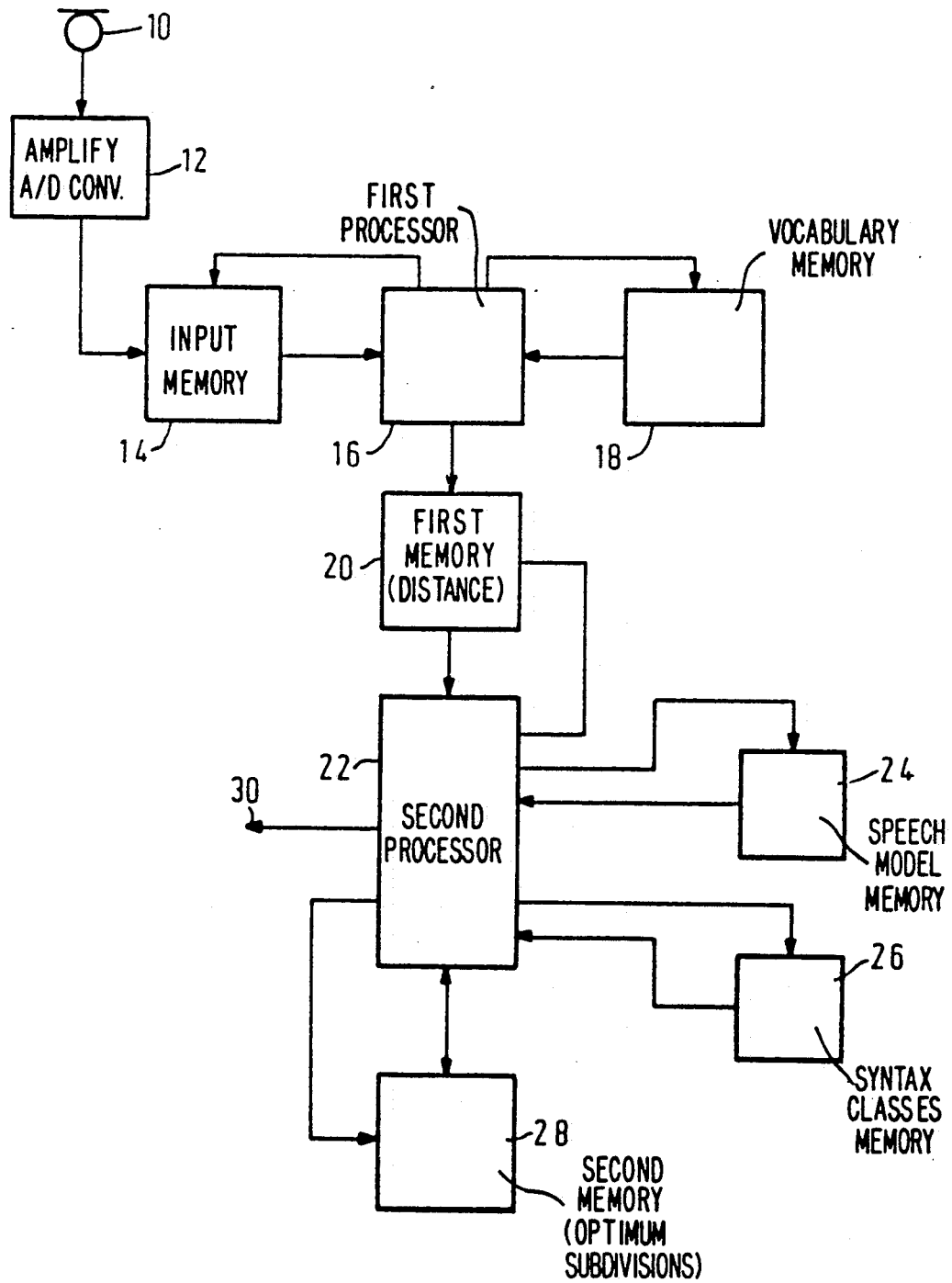
FIG. 8 shows a block circuit diagram of the arrangement for carrying out the method.

In the schematic block circuit diagram shown in FIG. 8 of an arrangement for carrying out the method described, in the block 12 the electrical speech signal supplied by the microphone 10 is amplified and is converted into a sequence of digital speech values, which are stored in the memory for speech values 14. A memory 18 contains the comparison values of the words of a given vocabulary.

A first processing circuit 16 addresses the two memories 14 and 18 and determines each time an instantaneous speech value and a sequence of past speech values from the memory for speech values 14 with reference to the comparison values from the memory 18 the distance sums for the different sequences of combinations of speech values and comparison values. The distance sums are written into a first memory 20.

After the distance sums for each time a number of sequences in all words have been determined, a second processing circuit 22 addresses successively all the addresses of a first memory 24, which contains a speech model or part thereof in the form of the assignments of each time a word to at least one syntactical class. For each time one word, the corresponding distance values at the individual starting points are read from the first memory by the processing circuit 22 and are stored at the corresponding storage sites of a second memory 28, the said storage site being determined by the class read from the speech model memory 24, the instantaneous speech value from the memory for speech values 14 and the respective starting point of the sequence. Storage occurs only when at the relevant point no smaller distance value is stored. Further, at each storage site moreover the corresponding address of the speech model memory 24 is also stored.

After the speech model memory 24 has completely been addressed, the whole contents of the first memory 20 having been processed, the first processing circuit 16 can take over the next speech value from the memory 14 and process it in order to fill again the first memory 20, while at the same time the second processing circuit 22 can address successively a further speech model memory 26, which contains the assignment of one syntactical class to further classes. For each subdivision, the corresponding values from the second memory 28 are read out by the second processing circuit 22 at different division points and the distance sums are added and compared with the distance sum of the subdivided class. If the latter is larger, the distance sum of the subdivision as well as an indication about this subdivision and the point of optimum subdivision are stored in the second memory 28.

After the end of the speech signals when all speech values have been processed by means of the first processing circuit 16 and the distance sums obtained therefrom have been processed through the second processing circuit 22, the second processing circuit addresses the second memory 28 at that class which indicates the whole spoken sentence, i.e. at the point of the last speech value and of the first starting value (see FIG. 5). It is determined from the subdivision indicated therein through the speech model memory 26, into which further classes the optimum sequence of words indirectly contained in the second memory 28 must be subdivided, and for each class thus found the corresponding point in the second memory 28 is addressed, while a further subdivision of the respective class is determined from the address of the speech model memory 26 then stored until a class is found which is only subdivided into given words. These words finally indicate in the corresponding order of succession the sentence reproducing most satisfactorily the speech signal received by the microphone 10 and this sequence of words is supplied at the output 30.

The processing circuits 16 and 22 are effectively constituted by a processor, as the case may be by a microprocessor of corresponding performance. It is also possible to realize the two processing circuits 16 and 22 by a single processor, as a result of which, however, the processing speed is then reduced.

I claim:

1. A method of recognizing a speech signal which is derived from coherently spoken words and includes a temporal sequence of speech values, each of which indicates a section of the speech signal, comprising: comparing the speech values with given stored comparison values, of which each time a group of comparison values represents a word of a given vocabulary; summing the comparison results over different sequences of combinations of comparison values and speech values to a distance sum per sequence, at each new speech value for each word calculating and storing in a first memory a distance sum of such sequences which for each word begin at different earlier speech values as a starting point, traverse the whole word as far as the instantaneous speech value and, related to the respective starting point, produce a minimum distance sum; then, for each of these starting points, according to an assignment contained in a first stored list of the words of the vocabulary to per word at least one syntactical class, for each class storing the smallest distance sum of all words assigned to this class together with an indication about the assignment of the word yielding this smallest distance sum in a second memory; subsequently, according to a second stored list, checking whether and into which two further syntactical classes each class can be subdivided and each time that a subdivisibility is ascertained again for each starting point as far as the earliest speech signal, adding each distance sum stored for the one of the two further classes for the respective starting point and a number of intermediate points lying successively at points adjacent to each other between the starting point and the instantaneous speech value, and each distance sum stored for the other of the two further classes for each intermediate point and the instantaneous speech value, and comparing each sum with the distance sum of the subdivided class and, in case it is larger than the smallest of the added distance sums, storing said sum instead thereof together with an indication about the subdivision at the particular intermediate point which has yielded the smallest sum; and after processing the last speech value from the class indicating a whole sentence through the subdivision into further classes indicated therein at the storage site for the first speech value as starting point and through the subdivision indicated at the respective further classes, determining a sequence of words and supplying same as recognized spoken words.

2. A method as claimed in claim 1, characterized in that for determining the distance sums the starting points of the sequences cover at most twice the length of the longest word of the vocabulary back from the instantaneous speech value.

3. An arrangement for carrying out the method claimed in claim 1 comprising:
- a comparison value memory for storing comparison values of a number of words,
- an input circuit for producing electrical speech signals from an acoustic speech signal,
- a first processing circuit for comparing the speech signals with the comparison values and for producing distance sums,
- a first memory which, each time at a speech value, stores the distance sums per word for several sequences which each time begin at one of a number of preceding speech values, and is overwritten at each following speech value, a second memory which, for each syntactical class per speech value and per preceding speech value, contains a distance sum as well as the address of a speech model memory, which contains the assignment of the words to given syntactical classes and their mutual assignment, a second processing circuit which, for each word, reads the syntactical class from the speech model memory and writes the distance sums contained in the first memory for the relevant word together with a reference to the corresponding address of the speech model memory into the second memory at a storage site corresponding to the class, to the speech value and to the preceding speech value, as far as said storage site contains a larger distance sum, and then reads from the speech model memory assignments of a syntactical class to two further classes and which for said further classes reads and adds at storage sites of the second memory corresponding to different combinations of speech value and preceding speech value and stores the minimum sum of the distance values of the further classes at the storage site of the first class together with an indication about the subdivision yielding the minimum sum and with further indications and which after processing of the last speech value, starting from the class indicating the whole sentence, determines and supplies successively a sequence of words through the further classes each time indicated therein in the second memory.

4. An arrangement as claimed in claim 3, characterized in that at least one of the processing circuits comprises a microprocessor.

* * * * *